(12) United States Patent
Seemann et al.

(10) Patent No.: US 10,306,913 B2
(45) Date of Patent: Jun. 4, 2019

(54) FILL PLATE

(71) Applicant: Provisur Technologies, Inc., Chicago, IL (US)

(72) Inventors: Allen Roy Seemann, Peotone, IL (US); Wouter Bart Erné, Frankfort, IL (US)

(73) Assignee: Provisur Technologies, Inc., Chicago, IL (US)

( * ) Notice: Subject to any disclaimer, the term of this patent is extended or adjusted under 35 U.S.C. 154(b) by 157 days.

(21) Appl. No.: 15/424,319

(22) Filed: Feb. 3, 2017

(65) Prior Publication Data
US 2017/0224006 A1 Aug. 10, 2017

Related U.S. Application Data

(60) Provisional application No. 62/291,209, filed on Feb. 4, 2016.

(51) Int. Cl.
*A23P 30/10* (2016.01)
*A22C 7/00* (2006.01)

(52) U.S. Cl.
CPC ............ *A23P 30/10* (2016.08); *A22C 7/0084* (2013.01)

(58) Field of Classification Search
CPC .............................. A23P 30/10; A22C 7/0084
USPC ........................................ 425/197, 200, 573
See application file for complete search history.

(56) References Cited

U.S. PATENT DOCUMENTS

| | | | |
|---|---|---|---|
| 3,503,342 A * | 3/1970 | Ilines | A21C 11/16 425/192 R |
| 3,598,139 A * | 8/1971 | Boden | B29B 7/26 137/240 |
| 3,697,208 A * | 10/1972 | Munk | B27N 5/00 28/124 |
| 3,887,964 A | 6/1975 | Richards | |
| 4,054,967 A | 10/1977 | Sandberg et al. | |
| 4,182,003 A | 1/1980 | Lamartino et al. | |
| 4,356,595 A | 11/1982 | Sandberg et al. | |
| 4,541,143 A * | 9/1985 | Holly | A22C 7/0084 426/513 |
| 4,608,731 A * | 9/1986 | Holly | A22C 7/0084 426/513 |
| 6,517,340 B2 | 2/2003 | Sandberg | |
| 6,572,360 B1 | 6/2003 | Buhlke et al. | |
| 7,862,330 B2 | 1/2011 | Hansen et al. | |
| 9,095,171 B2 | 8/2015 | Lindee et al. | |

(Continued)

OTHER PUBLICATIONS

International Search Report from corresponding International Patent Application No. PCT/US17/16475 dated Jun. 12, 2017, 5 pages.

(Continued)

*Primary Examiner* — Nahida Sultana
(74) *Attorney, Agent, or Firm* — Klintworth & Rozenblat IP LLP

(57) ABSTRACT

A fill plate for a food patty molding machine according to some embodiments of the disclosure includes a plate having a plurality of spaced apart passageways extending therethrough. The plate has a center cylindrical passageway and a plurality of passageways surrounding the center passageway. Each surrounding passageway has an inlet section and an outlet section which angled relative to the inlet section. Sets of passageways have differing angles at which the outlet sections are angled relative to the inlet sections.

20 Claims, 16 Drawing Sheets

(56) References Cited

U.S. PATENT DOCUMENTS

| | | |
|---|---|---|
| 9,113,638 B2 | 8/2015 | Lindee et al. |
| 2007/0098862 A1 | 5/2007 | Hansen et al. |
| 2013/0064916 A1* | 3/2013 | Wolff ............... A47J 43/20 |
| | | 425/198 |
| 2013/0084350 A1* | 4/2013 | Wolff ............... A22C 7/00 |
| | | 425/377 |
| 2014/0252668 A1* | 9/2014 | Austin ............... B28B 3/20 |
| | | 264/40.7 |
| 2015/0208674 A1* | 7/2015 | Van Zoelen ......... A22C 7/00 |
| | | 426/513 |
| 2016/0302470 A1* | 10/2016 | Van Gerwen ....... A22C 7/0084 |

OTHER PUBLICATIONS

Written Opinion from corresponding International Patent Application No. PCT/US17/16475 dated Jun. 12, 2017, 13 pages.

"Plate-Fill-T/F—30° Angle," Drawing No. ED-9675, dated Jan. 27, 1995, 1 page.

"Hard Chrome," Drawing No. D-22884, dated Feb. 13, 1990, 1 page.

"Plate-Fill-Tenderform 400 Series SST," D-36546, dated Dec. 9, 1998, 1 page.

"Plate-T/F—0.25 Dia Angled 45° Roy Alloy EDRO#6," D-67228, dated Jun. 6, 2011, 1 page.

"Plate-Fill-Tenderform RoyAlloy EDRO#6," D-73335, dated Nov. 18, 2014, 1 page.

"Fill Plate—.38 Tenderform," Drawing No. D-73894, dated Oct. 22, 2015, 1 page.

* cited by examiner

US 10,306,913 B2

FILL PLATE

This application claims priority to U.S. provisional application Ser. No. 62/291,209, filed on Feb. 4, 2016, the contents of which are incorporated herein in its entirety.

FIELD OF THE DISCLOSURE

The present disclosure relates to a fill plate for a food patty molding machine.

BACKGROUND

Food patties of various kinds, including hamburgers, molded "steaks", fish cakes, chicken patties, pork patties, potato patties, and others, are frequently formed in high-volume automated food patty molding machines. Food patty molding machines are described in U.S. Pat. Nos. 3,887,964; 4,054,967, and 4,182,003.

An apparatus for molding food patties that have essentially uniform texture and minimal shrinkage when cooked is disclosed in Sandberg et al., U.S. Pat. No. 4,356,595. The patties also hold their shape consistently after cooking. The apparatus includes a multi-orifice plate interposed in the outlet end of a fill passage extending from a food pump to a cyclically reciprocating mold plate. The food pump is preferably controlled so that the maximum fill pressure, desirable for consistent filling of the mold cavities, is used for only a limited part of each mold plate cycle.

U.S. Pat. No. 7,862,330 to Hansen provides a food patty molding machine having a mold plate having at least one mold cavity therein. A mold plate drive is connected to the mold plate for driving the mold plate along a given path, in a repetitive cycle, between a fill position and a discharge position. A food pump is provided for pumping a moldable food product through a fill passage connecting the food pump to the mold cavity when the mold plate is in its fill position. A fill plate, interposed in the fill passage immediately adjacent the mold plate, has a multiplicity of fill orifices distributed in a predetermined pattern throughout an area aligned with the mold cavity when the mold plate is in its fill position. The fill orifices define paths through the fill plate, wherein some of the paths each have a path portion that is obliquely angled to a fill side face of the mold plate.

SUMMARY

A fill plate for a food patty molding machine according to some embodiments of the disclosure includes a plate having a plurality of spaced apart passageways extending therethrough. The plate has a center cylindrical passageway and a plurality of passageways surrounding the center passageway. Each surrounding passageway has an inlet section and an outlet section which angled relative to the inlet section. Sets of passageways have differing angles at which the outlet sections are angled relative to the inlet sections.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
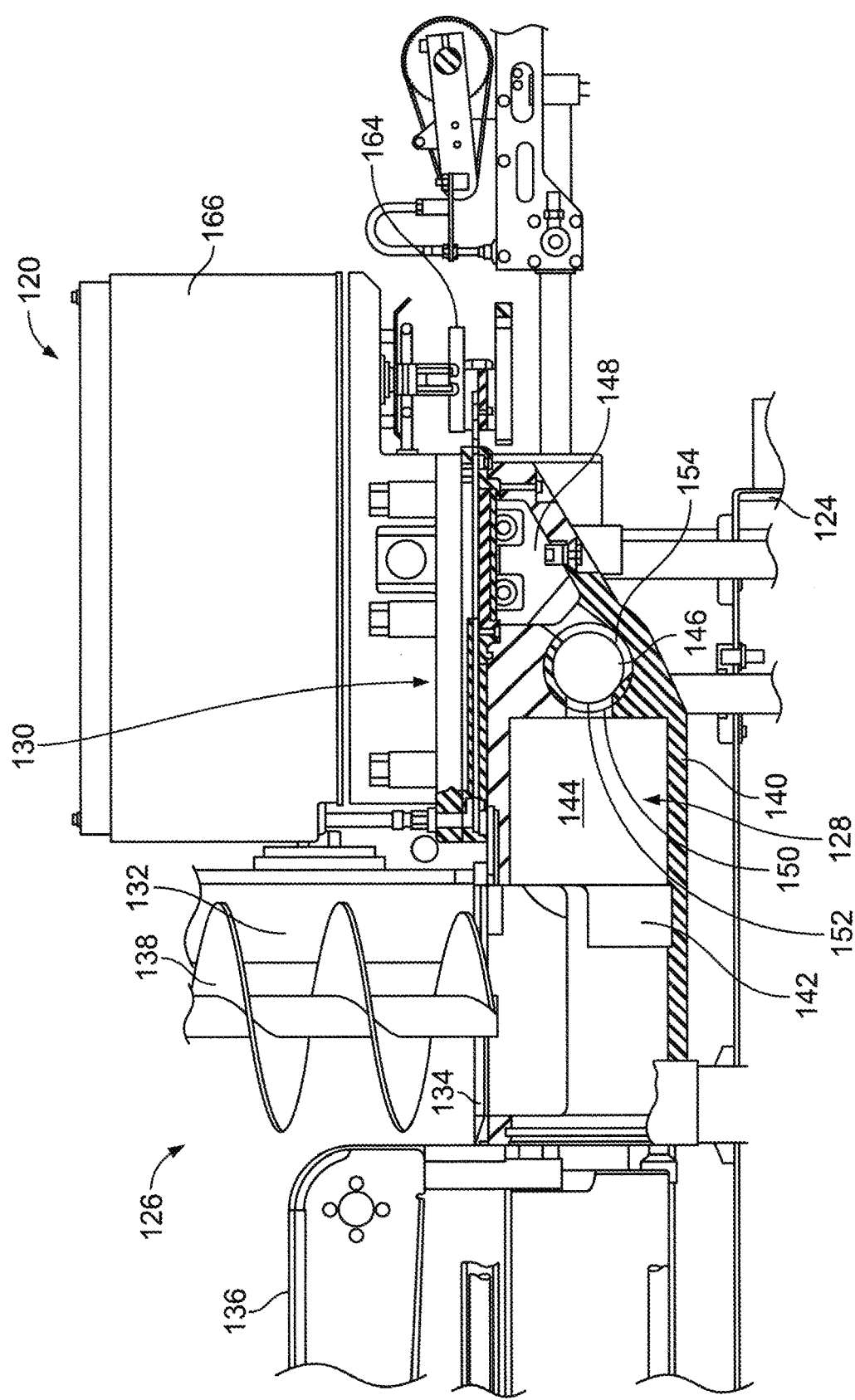
FIG. 1 is a fragmentary sectional view of a food patty molding machine incorporating a fill plate of the present disclosure.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

The present disclosure provides an improved fill plate 20, see FIGS. 3-12B, for use in a food patty molding machine 120, see FIG. 1.

The fill plate 20 has a fill face 20a and a discharge face 20b, which are bounded by an edge 22. The fill face 20a is planar and defines a first plane. The discharge face 20b is planar and defines a second plane. The first and second planes are parallel. A plurality of spaced apart passageways 24, 30, 40, 50, 60, 70, 80 extend through the fill plate 20 from the fill face 20a to the discharge face 20b, and are distributed throughout substantially its entire surface area to form an array. The passageways 24, 30, 40, 50, 60, 70, 80 are formed in evenly spaced rows and columns. As shown, the passageways 24, 30, 40, 50, 60, 70, 80 form a square array, but this array may take other shapes. For example, the array can be rectangular; the array can be circular; the array can be a diamond shape, etc. As shown, the edge 22 of the fill plate 20 is rectangular, but the edge 22 may take other shapes, for example, circular, square, etc.

A cylindrical center passageway 24 is perpendicular to the fill face 20a and to the discharge face 20b. The center passageway 24 defines a centerline 26 which extends therethrough and is perpendicular to the fill face 20a and to the discharge face 20b. The center passageway 24 has an inlet 24a and an outlet 24b, each of which is circular.

Each passageway 30 has an inlet 30a at the fill face 20a, an inlet section 34 which extends from the inlet 30a and is perpendicular to the fill face 20a and to the discharge face 20b, and an outlet section 36 which extends from the inlet section 34 to an outlet 30b at the discharge face 20b. The inlet section 34 defines a centerline 38 which extends therethrough, is parallel to the centerline 26 of the center passageway 24, and is perpendicular to the fill face 20a and to the discharge face 20b. In an embodiment, the inlet section 34 is cylindrical and the outlet section 36 is generally cylindrical.

The inlet section 34 and the outlet section 36 of each passageway 30 is bisected into halves by a respective imaginary line (the lines are shown in solid in FIG. 8B) which radiates outwardly from the center passageway 24. The imaginary lines are equally spaced apart from each other around an imaginary circle formed on the discharge face 20b. The passageways 30 surround the center passageway 24 and are spaced outwardly from the center passageway 24 to form a set of passageways 30, are evenly spaced from the center passageway 24, are spaced apart from each other, form an imaginary first square 32a on the fill face 20a, see FIG. 8A, and an imaginary first square 32b on the discharge face 20b, see FIG. 8B. The first square 32a is inside the first square 32b.

The inlet 30a is circular.

The outlet section 36 of each passageway 30 defines a centerline 39 which extends therethrough, and which is angled at an acute angle α relative to the centerline 38 of the inlet section 34, and thus angles at the same angle from the centerline 26 of the center passageway 24. The angle α may be 7 degrees. The outlet section 36 angles outwardly and upwardly moving in a direction from the fill face 20a to the discharge face 20b from the centerlines 26, 38 along the respective imaginary line. Because the outlet sections 36 are inclined to the discharge face 20b of the fill plate 20, the outlets 30b appear as elongated ellipses in FIG. 8B.

Each passageway 40 has an inlet 40a at the fill face 20a, an inlet section 44 which extends from the inlet 40a and is perpendicular to the fill face 20a and to the discharge face 20b, and an outlet section 46 which extends from the inlet section 44 to an outlet 40b at the discharge face 20b. The inlet section 44 defines a centerline 48 which extends therethrough, is parallel to the centerline 26 of the center passageway 24, and is perpendicular to the fill face 20a and to the discharge face 20b. In an embodiment, the inlet section 44 is cylindrical and the outlet section 46 is generally cylindrical.

The inlet section 44 and the outlet section 46 of each passageway 40 is bisected into halves by a respective imaginary line (the lines are shown in solid in FIG. 9B) which radiates outwardly from the center passageway 24. The imaginary lines are equally spaced apart from each other around an imaginary circle formed on the discharge face 20b. The passageways 40 surround the center passageway 24 and are spaced outwardly of the set of passageways 30, are evenly spaced from the center passageway 24, are spaced apart from each other, form an imaginary second square 42a on the fill face 20a, see FIG. 9A, and an imaginary second square 42b on the discharge face 20b, see FIG. 9B. The second square 42a is inside the second square 42b. The passageways 40 form a set.

The inlet 40a is circular.

The outlet section 46 of each passageway 40 defines a centerline 49 which extends therethrough, and which is angled at an acute angle β relative to the centerline 48 of the inlet section 44, and thus angles at the same angle from the centerline 26 of the center passageway 24. The angle β may be 14 degrees. The outlet section 46 angles outwardly and upwardly moving in a direction from the fill face 20a to the discharge face 20b from the centerlines 26, 48 along the respective imaginary line. Because the outlet sections 46 are inclined to the discharge face 20b of the fill plate 20, the outlets 40b appear as elongated ellipses in FIG. 9B.

Each passageway 50 has an inlet 50a at the fill face 20a, an inlet section 54 which extends from the inlet 50a and is perpendicular to the fill face 20a and to the discharge face 20b, and an outlet section 56 which extends from the inlet section 54 to an outlet 50b at the discharge face 20b. The inlet section 54 defines a centerline 58 which extends therethrough, is parallel to the centerline 26 of the center passageway 24, and is perpendicular to the fill face 20a and to the discharge face 20b. In an embodiment, the inlet section 54 is cylindrical and the outlet section 56 is generally cylindrical.

The inlet section 54 and the outlet section 56 of each passageway 50 is bisected into halves by a respective imaginary line (the lines are shown in solid in FIG. 10B) which radiates outwardly from the center passageway 24.

The imaginary lines are equally spaced apart from each other around an imaginary circle formed on the discharge face 20b. The passageways 50 surround the center passageway 24 and are spaced outwardly of the set of passageways 40, are evenly spaced from the center passageway 24, are spaced apart from each other, form an imaginary third square 52a on the fill face 20a, see FIG. 10A, and an imaginary third square 52b on the discharge face 20b, see FIG. 10B. The third square 52a is inside the third square 52b. The passageways 50 form a set.

The inlet 50a is circular.

The outlet section 56 of each passageway 50 defines a centerline 59 which extends therethrough, and which is angled at an acute angle γ relative to the centerline 58 of the inlet section 54, and thus angles at the same angle from the centerline 26 of the center passageway 24. The angle γ may be 21 degrees. The outlet section 56 angles outwardly and upwardly moving in a direction from the fill face 20a to the discharge face 20b from the centerlines 26, 58 along the respective imaginary line. Because the outlet sections 56 are inclined to the discharge face 20b of the fill plate 20, the outlets 50b appear as elongated ellipses in FIG. 10B.

Each passageway 60 has an inlet 60a at the fill face 20a, an inlet section 64 which extends from the inlet 60a and is perpendicular to the fill face 20a and to the discharge face 20b, and an outlet section 66 which extends from the inlet section 64 to an outlet 60b at the discharge face 20b. The inlet section 64 defines a centerline 68 which extends therethrough, is parallel to the centerline 26 of the center passageway 24, and is perpendicular to the fill face 20a and to the discharge face 20b. In an embodiment, the inlet section 64 is cylindrical and the outlet section 66 is generally cylindrical.

The inlet section 64 and the outlet section 66 of each passageway 60 is bisected into halves by a respective imaginary line (the lines are shown in solid in FIG. 11B) which radiates outwardly from the center passageway 24. The imaginary lines are equally spaced apart from each other around an imaginary circle formed on the discharge face 20b. The passageways 60 surround the center passageway 24 and are spaced outwardly of the set of passageways 50, are evenly spaced from the center passageway 24, are spaced apart from each other, form an imaginary fourth square 62a on the fill face 20a, see FIG. 11A, and an imaginary fourth square 62b on the discharge face 20b, see FIG. 11B. The fourth square 62a is inside the fourth square 62b. The passageways 60 form a set.

The inlet 60a is circular.

The outlet section 66 of each passageway 60 defines a centerline 69 which extends therethrough, and which is angled at an acute angle δ relative to the centerline 68 of the inlet section 64, and thus angles at the same angle from the centerline 26 of the center passageway 24. The angle δ may be 28 degrees. The outlet section 66 angles outwardly and upwardly moving in a direction from the fill face 20a to the discharge face 20b from the centerlines 26, 68 along the respective imaginary line. Because the outlet sections 66 are inclined to the discharge face 20b of the fill plate 20, the outlets 60b appear as elongated ellipses in FIG. 11B.

Each passageway 70 has an inlet 70a at the fill face 20a, an inlet section 74 which extends from the inlet 70a and is perpendicular to the fill face 20a and to the discharge face 20b, and an outlet section 76 which extends from the inlet section 74 to an outlet 70b at the discharge face 20b. The inlet section 74 defines a centerline 78 which extends therethrough, is parallel to the centerline 26 of the center passageway 24, and is perpendicular to the fill face 20a and to the discharge face 20b. In an embodiment, the inlet section 74 is cylindrical and the outlet section 76 is generally cylindrical.

The inlet section 74 and the outlet section 76 of each passageway 70 is bisected into halves by a respective imaginary line (the lines are shown in solid in FIG. 12B) which radiates outwardly from the center passageway 24. The imaginary lines are equally spaced apart from each other around an imaginary circle formed on the discharge face 20b. The passageways 70 surround the center passageway 24 and are spaced outwardly of the set of passageways 60, are evenly spaced from the center passageway 24, are spaced apart from each other, form an imaginary fifth square 72a on the fill face 20a, see FIG. 12A, and an imaginary fifth square 72b on the discharge face 20b, see FIG. 12B. The fifth square 72a is inside the fifth square 72b. The passageways 70 form a set.

The inlet 70a is circular.

The outlet section 76 of each passageway 70 defines a centerline 79 which extends therethrough, and which is angled at an acute angle ε relative to the centerline 78, and thus angles at the same angle from the centerline 26 of the center passageway 24. The angle ε may be 35 degrees. The outlet section 76 angles outwardly and upwardly moving in a direction from the fill face 20a to the discharge face 20b from the centerlines 26, 78 along the respective imaginary line. Because the outlet sections 76 are inclined to the discharge face 20b of the fill plate 20, the outlets 70b appear as elongated ellipses in FIG. 12B.

Figure 12A:
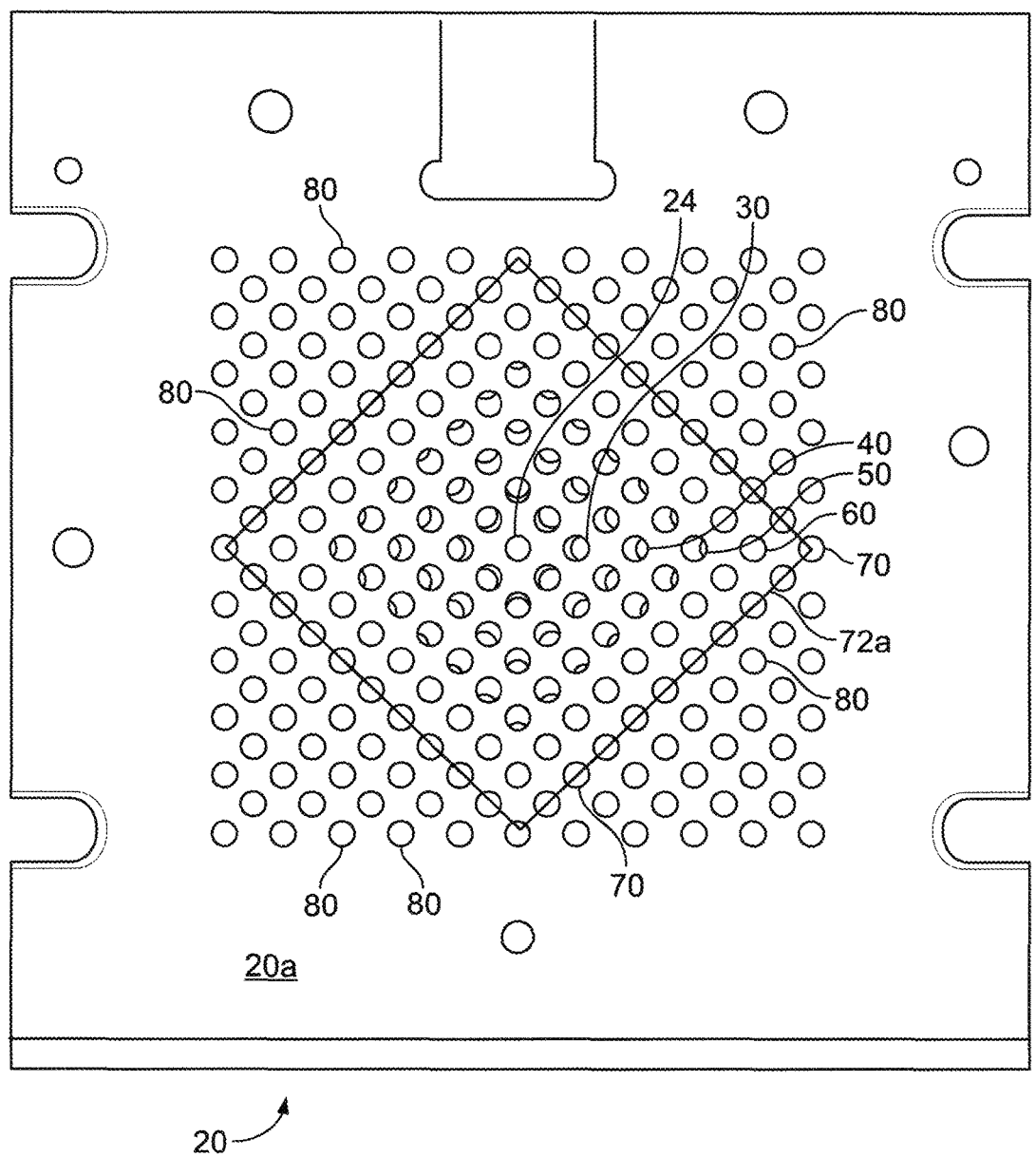
FIG. 12A is a plan view of the fill plate from a fill face side of the fill plate and showing a set of passageways with a fifth imaginary square on the fill face side.
Figure 12B:
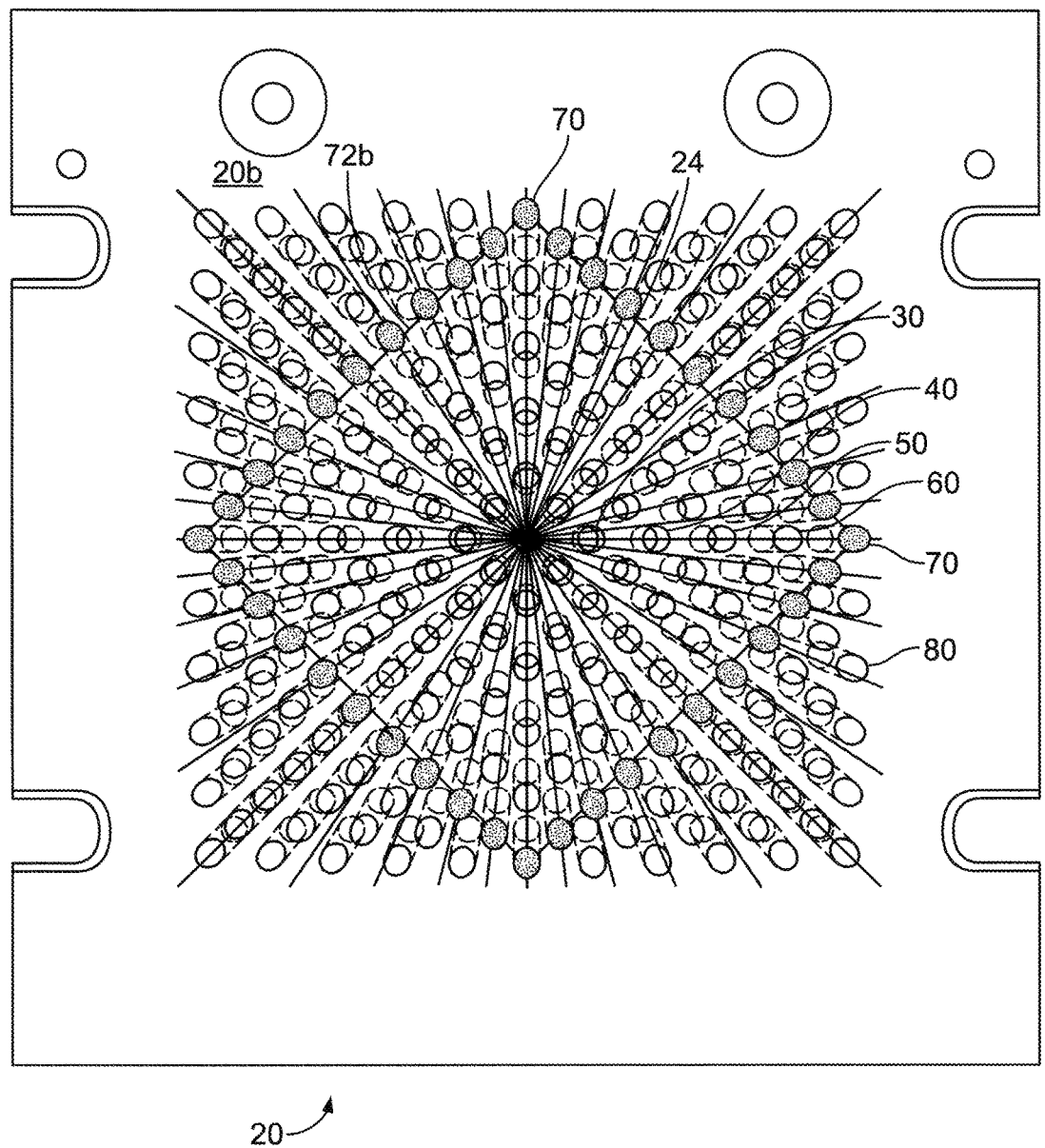
FIG. 12B is a plan view of the fill plate from the discharge face side of the fill plate and showing the set of passageways of FIG. 12A with a fifth imaginary square on the discharge face side, the inlets of the passageways through the fill plate begin shown in phantom line.

As further shown in FIGS. 12A and 12B, a plurality of passageway 80 are provided in the fill plate 20 outwardly of the fifth squares 72a, 72b. These passageways 80 form squares which have their corners cut off because of the edge of the array. Each of these further passageways 80 have the same structure as passageways 70 and thus the specifics are not repeated herein. Each of these further passageways 80 falls along a respective imaginary line that radiates outwardly from the center passageway 24.

As such, each passageway 30, 40, 50, 60, 70, 80 has an inlet section 34, 44, 54, 64, 74 which is perpendicular to the fill face 20a and the discharge face 20b and an outlet section 36, 46, 56, 66, 76 which is angled at an acute angle relative to the inlet section 34, 44, 54, 64, 74. Each passageway 30, 40, 50, 60, 70, 80 has an inlet section 34, 44, 54, 64, 74 and an outlet section 36, 46, 56, 66, 76 which is bisected by an imaginary line that extends radially outwardly from the center passageway 24.

Passageways 24, 30, 40, 50, 60, 70 extend along the imaginary lines which extend outwardly from the center passageway at the 0-degree position, the 45-degree position, the 90-degree position, the 135-degree position, the 180-degree position, the 225-degree position, the 270-degree position, the 315-degree position. Additional passageways 80 could also be provided along these imaginary lines, and is only limited by the size of the array.

Angle β is greater than angle α. Angle γ is greater than angle β. Angle δ is greater than angle γ. Angle ε is greater than angle δ.

As an example, the fill plate 20 may have a thickness of about 0.625 inches. The inlet section 34, 44, 54, 64, 74 of each passageway 30, 40, 50, 60, 70, 80 may have a diameter of 0.25 inches. The outlet section 36, 46, 56, 66, 76 each passageway 30, 40, 50, 60, 70, 80 may have a diameter of about 0.25 inches. The intersection point between the inlet section 34, 44, 54, 64, 74 and the outlet section 36, 46, 56, 66, 76 occurs at a depth of about 0.14 inches from the fill face 20a of the fill plate 20.

FIG. 1 illustrates an example of food patty molding machine 120. The food patty molding machine 120 may be formed as shown in U.S. Pat. No. 9,113,638 to Lindee et al or U.S. Pat. No. 9,095,140 to Lindee et al., both of which are incorporated by reference in their entirety. In general, the food patty molding machine 120 includes a machine base 124 which supports the operating mechanisms of the food patty molding machine 120 and contains hydraulic actuating systems, electrical actuating systems, and most of the machine controls. The details of the molding station 130 are better illustrated in FIG. 2. The food patty molding machine 120 includes a supply apparatus 126, a food pump system 128 in communication with the supply apparatus 126 and downstream of the supply apparatus 126, a molding station 130 in communication with the food pump system 128 and downstream of the food pump system 128, and a takeoff conveyor (not shown) in communication with the molding station 130 and downstream of the molding station 130. The supply apparatus 126 stores and supplies a moldable food product, such as ground beef, fish, pork, chicken, potatoes, or the like, to the molding station 130. The molding station 130 forms the individual patties. The takeoff conveyor moves the formed patties from the molding station 130 to a final destination for further packaging. The fill plate 20 forms part of the molding station 130.

The supply apparatus 126 includes a large food product storage hopper 132 having a hopper outlet 134 that supplies food product to the food pump system 128. The supply apparatus 126 includes a conveyor belt 136 that extends across the bottom of hopper 132. The conveyor belt 31 is driven in circulation to deliver food product in the hopper 132 to one or more feed screws 138. The feed screw(s) 138 are driven in rotation to deliver food product from the hopper outlet 134 to the food pump system 128. While the feed screw(s) 138 is shown as vertical in the drawings, the feed screw 138 may be horizontally positioned or positioned at an angle.

The food pump system 128 includes a housing 140, two food pumps 142 (only one of which shown) operating in alternation and mounted on the housing 140, two pump chambers 144 (only one of which is shown) enclosed in the housing 140 and downstream of the hopper outlet 134, a manifold 146 mounted in the housing 140 and downstream of the pump chambers 144, and a fill passageway 148 enclosed in the housing 140 and downstream of the manifold 146. The pump chambers 144 are downstream of the hopper outlet 134 such that the hopper outlet 134 passes food into the pump chambers 144. The manifold 146 is downstream of the pump chambers 144 and is upstream of the fill passageway 148. The fill passageway 148 is downstream of the manifold 146 and is upstream of the molding station 130. The manifold 146 receives food product from the pump chambers 144 and supplies the food product to the fill passageway 148, which in turn, supplies the food product to the molding station 130.

The food pumps 142 interact with the pump chambers 144 to pump food outwardly of the pump chambers 144 and into the manifold 146. Each pump chamber 144 includes an outlet slot 150 that communicates with the manifold 146. While two food pumps 142 are shown, this disclosure is not limited to a food patty molding machine 120 having two food pumps. The two food pumps 142 continuously pump food, under pressure, from the pump chambers 144 into the manifold 146.

The manifold 146 may be formed as a valve cylinder which includes two intake slots; only one intake slot 152 is illustrated. The intake slot 152 is alignable with the outlet slot 150 in the pump chambers 144, and this is the position employed when the food pump 142 is in use. Rotation of the manifold 146 is effective to move the intake slot 152 out of alignment with the outlet slot 150 of the pump chamber 144 when the other pump of the food patty molding machine 120 is in operation. The manifold 146 also includes an elongated outlet slot 154 which passes the food product into the fill passageway 148 and to the molding station 130.

The molding station 130 includes a stripper plate 156 which is downstream of the fill passageway 148, the fill plate 20 which is downstream of the stripper plate 156, a multi-cavity mold plate 158 which is downstream of the fill plate 20, a breather plate 160 which is downstream of the mold plate 158, and a mold cover 162 which is downstream of the breather plate 160.

The stripper plate 156 is slidably mounted on the housing 140 in the fill passageway 148 of the food pump system 128 and moveable between a fill position and a cutting position. Stripper plates are known in the art. As shown, the stripper plate 156 has a fill face 156a and a discharge face 156b, both of which are planar. A plurality of spaced apart cylindrical passageways 157 extend through the stripper plate 156 from the fill face 156a to the discharge face 156b, and are distributed throughout substantially its entire surface area. Each passageway 157 has a fill inlet 157a along the fill face 156a and a discharge outlet 157b along the discharge face 156b. The passageways 157 may be aligned in parallel rows with equal center-to-center spaces between the passageways 157 in the direction of the passageway rows. Each passageway 157 is perpendicular to the planes defined by the fill face 156a and the discharge face 156b.

The fill face 20a of the fill plate 20 is disposed in surface-to-surface contact with the discharge face 156b of the stripper plate 156.

When the stripper plate 156 is in its fill position, the passageways 157 in the stripper plate 156 are aligned one-for-one with the passageways 24, 30, 40, 50, 60, 70, 80 in the fill plate 20 to allow food product to pass through the stripper plate 156 and into the fill plate 20. The passageways 157 in the stripper plate 156 are an extension of the respective passageways 24, 30, 40, 50, 60, 70, 80 of the fill plate 20. When the stripper plate 156 is in its cutting position, the passageways 157 in the stripper plate 156 are misaligned with the passageways 24, 30, 40, 50, 60, 70, 80 in the fill plate 20. Upon sliding, this causes the food product to be cut by the stripper plate 156.

The mold plate 158 has a fill face 158a and a discharge face 158b, both of which are planar. A plurality of spaced apart individual mold cavities 158c extend through the mold plate 158 from the fill face 158a to the discharge face 158b. The fill face 158a of the mold plate 158 is disposed in surface-to-surface contact with the discharge face 20b of the fill plate 20. The mold plate 158 moves cyclically between a fill position, shown in FIG. 1, in which the mold cavities 158c are in alignment with the outlets 24b, 30b, 40b, 50b, 60b, 70b of the passageways 24, 30, 40, 50, 60, 70, 80, and a discharge position in which the mold cavities 158c are outside of the molding station 130, and are aligned with a set of knock-out cups 164.

Figure 2:
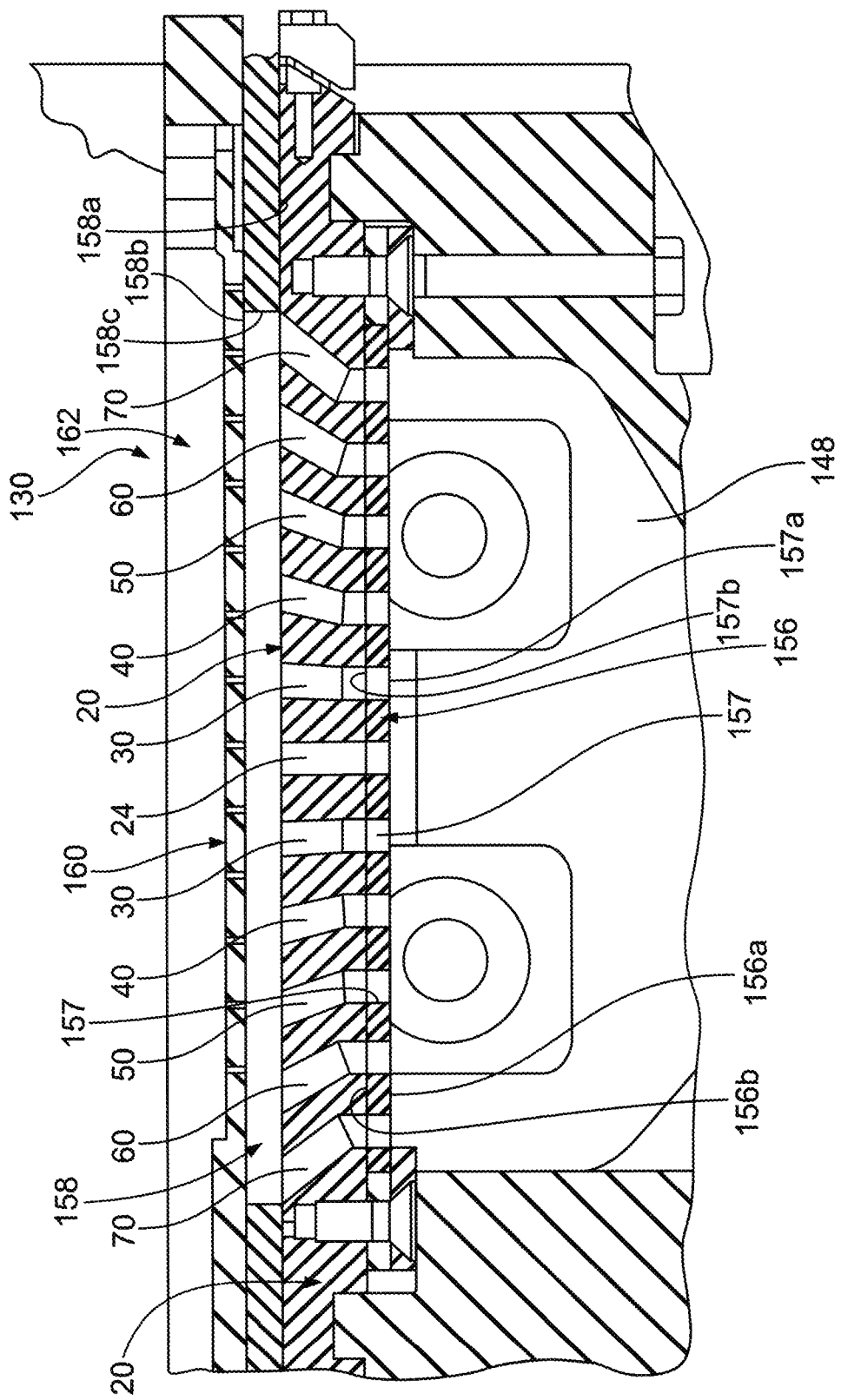
FIG. 2 is an enlarged fragmentary sectional view of the food patty molding machine.
Figure 3:
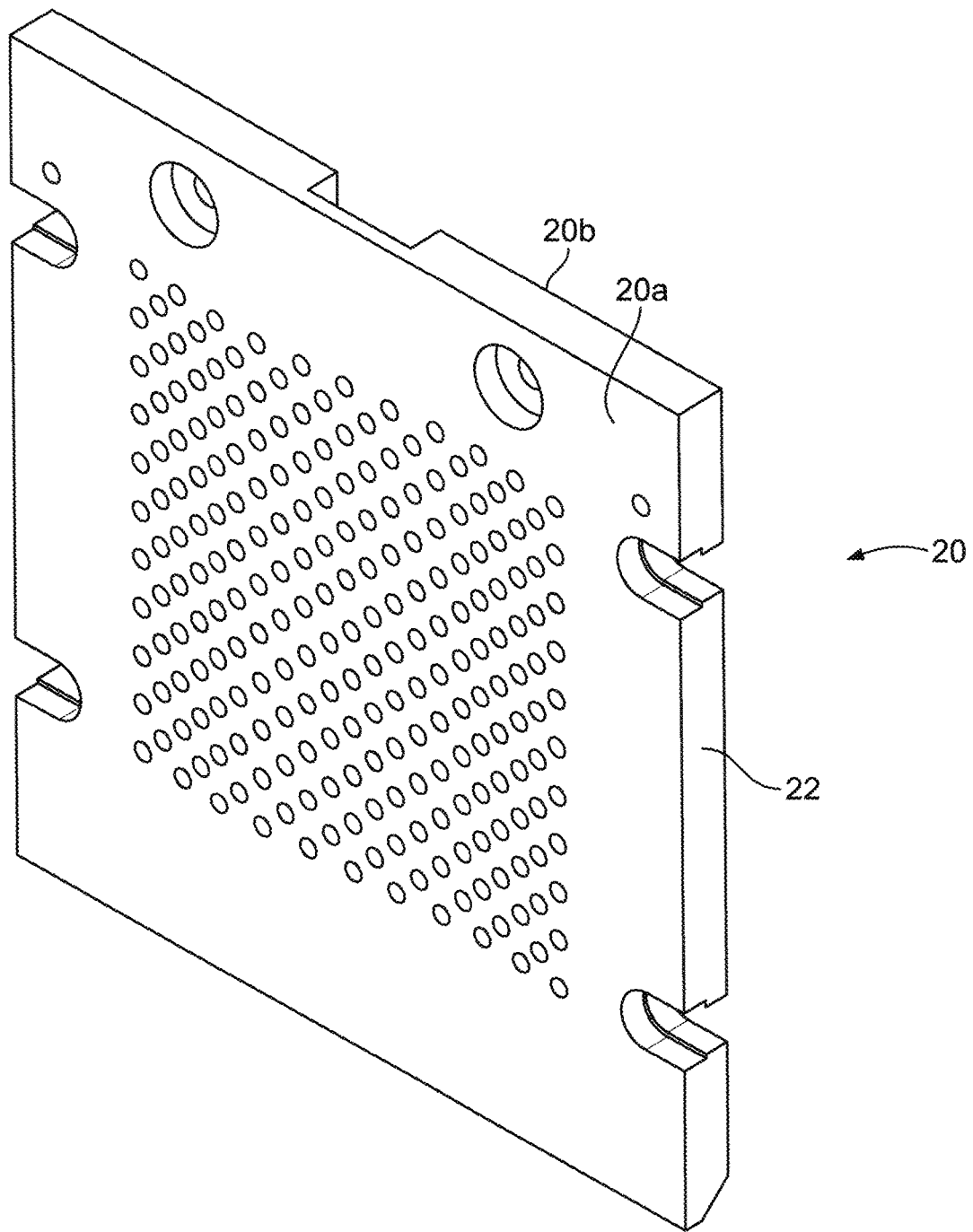
FIG. 3 is a perspective view of the fill plate.
Figure 4:
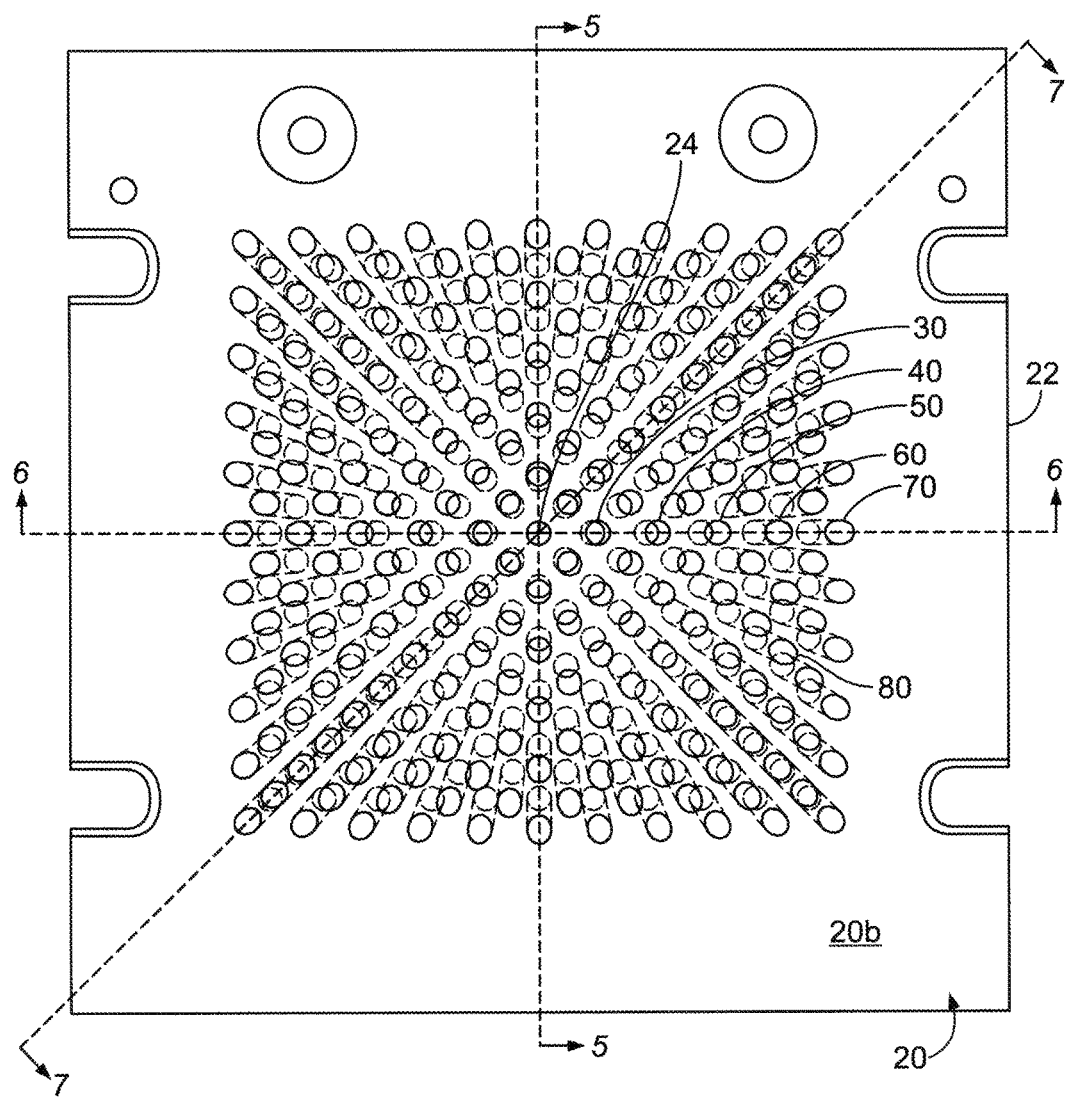
FIG. 4 is plan view of the fill plate from a discharge face side of the fill plate, showing inlets of passageways through the fill plate in phantom line.
Figure 5:
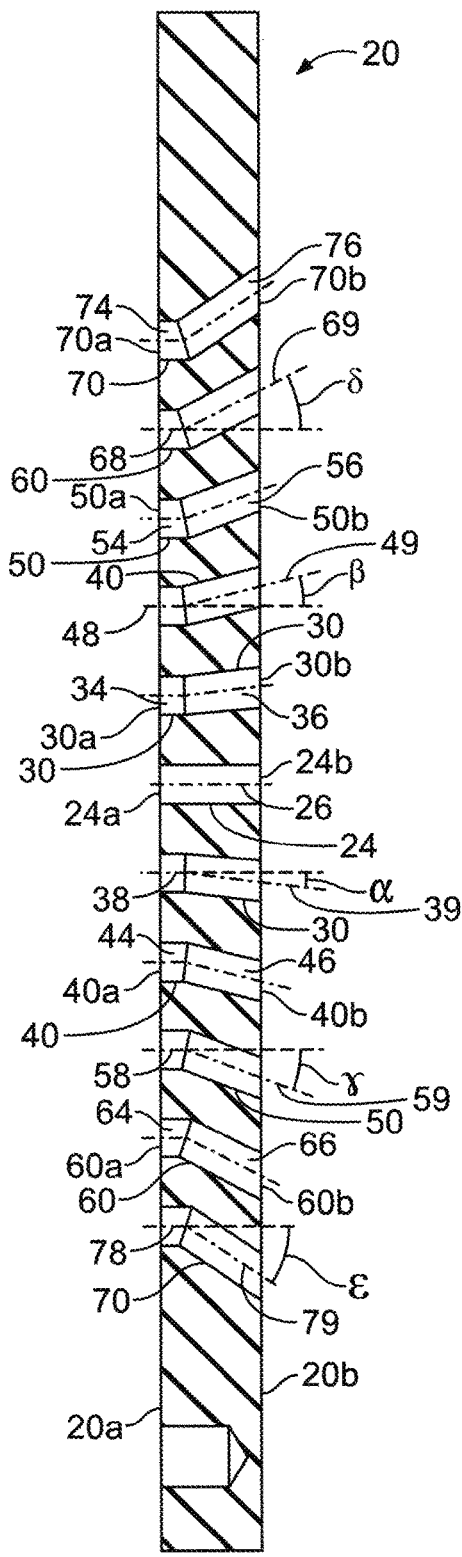
FIG. 5 is a cross-sectional view of the fill plate along line 5-5 of FIG. 4.
Figure 6:
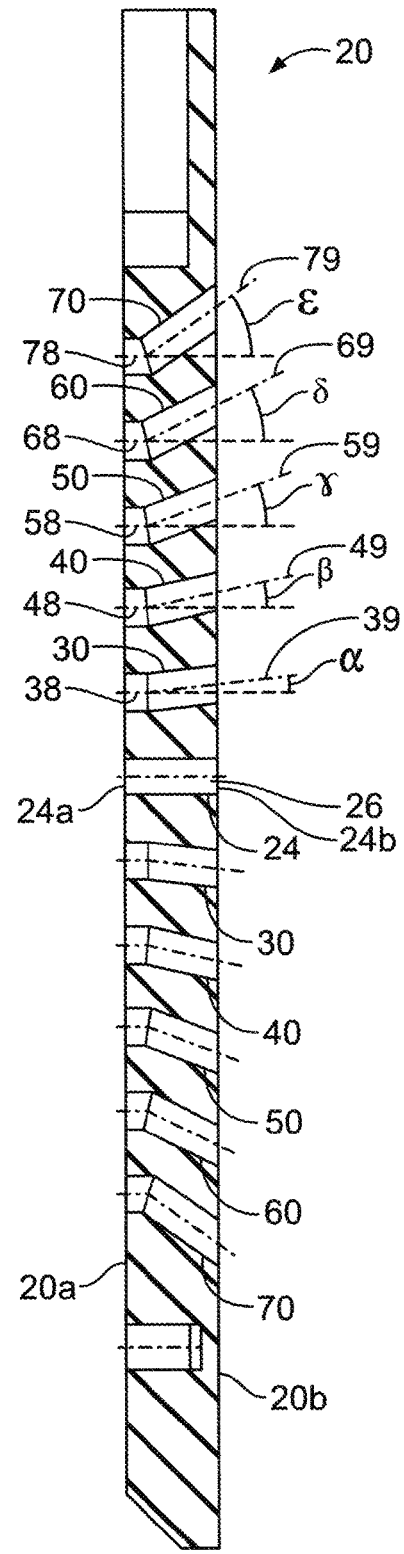
FIG. 6 is a cross-sectional view of the fill plate along line 6-6 of FIG. 5.
Figure 7:
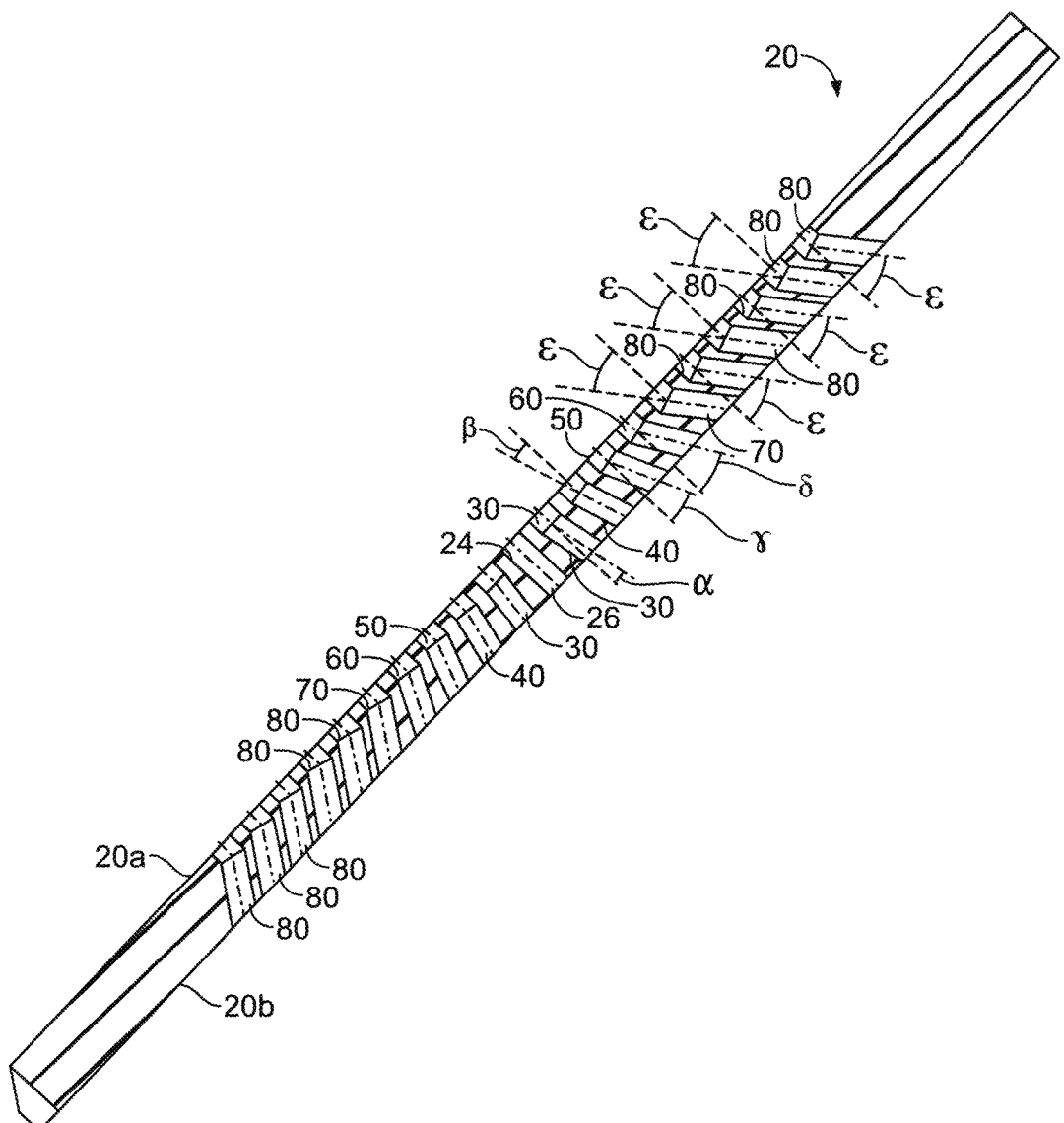
FIG. 7 is a cross-sectional view of the fill plate along line 7-7 of FIG. 4.
Figure 8A:
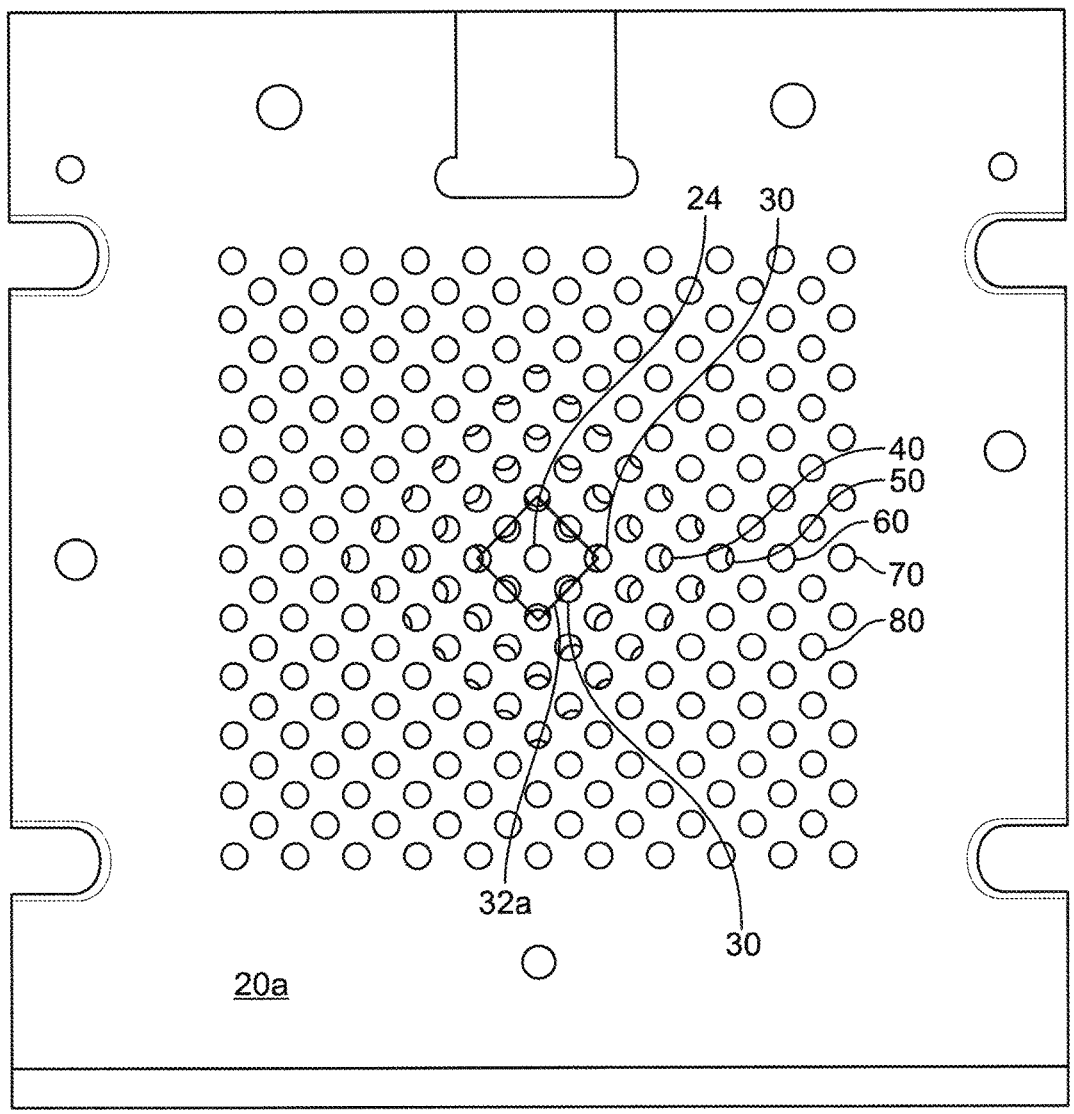
FIG. 8A is a plan view of the fill plate from a fill face side of the fill plate and showing a set of passageways with a first imaginary square on the fill face side.
Figure 8B:
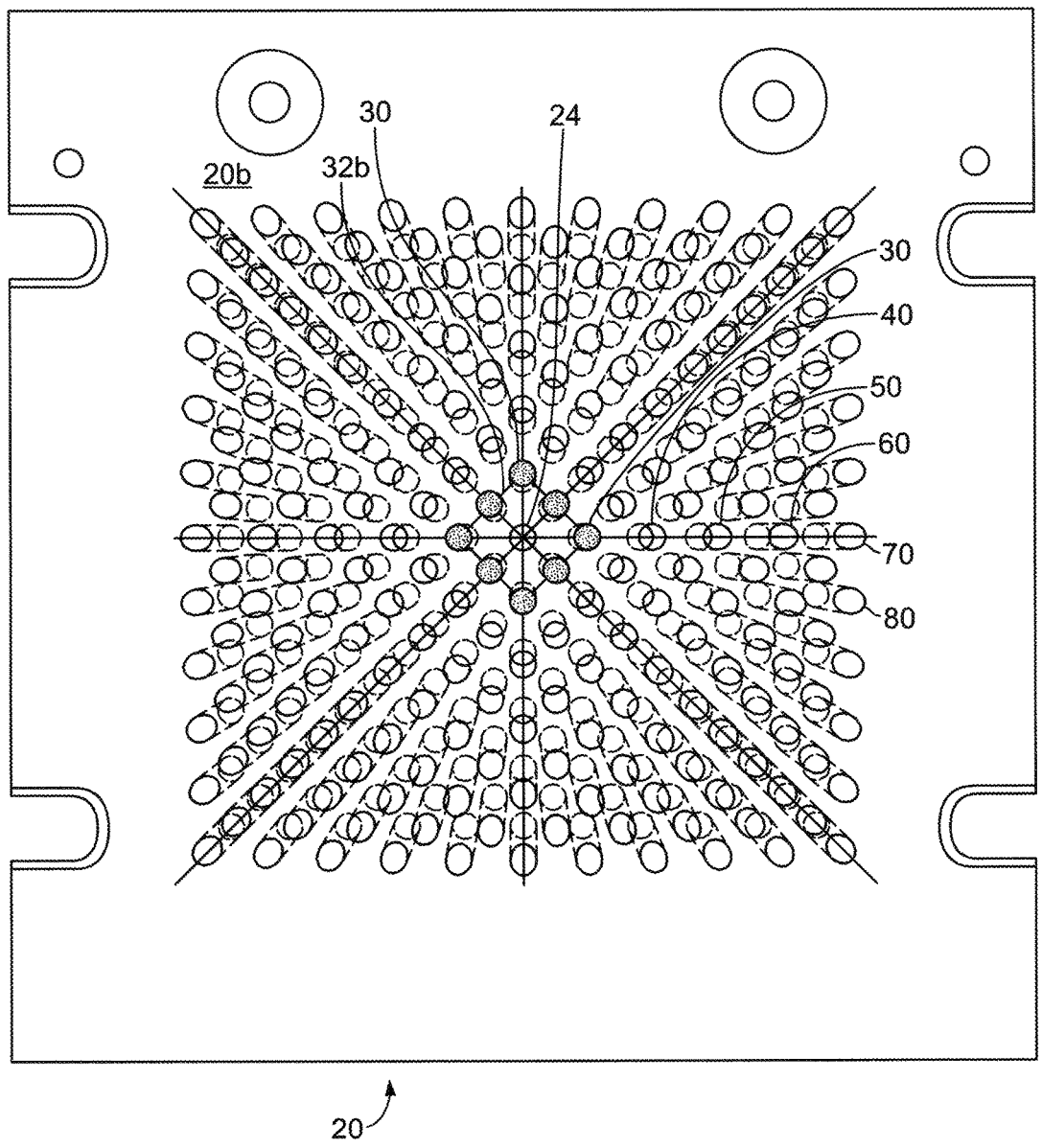
FIG. 8B is a plan view of the fill plate from the discharge face side of the fill plate and showing the set of passageways of FIG. 8A with a first imaginary square on the discharge face side, the inlets of the passageways through the fill plate begin shown in phantom line.
Figure 9A:
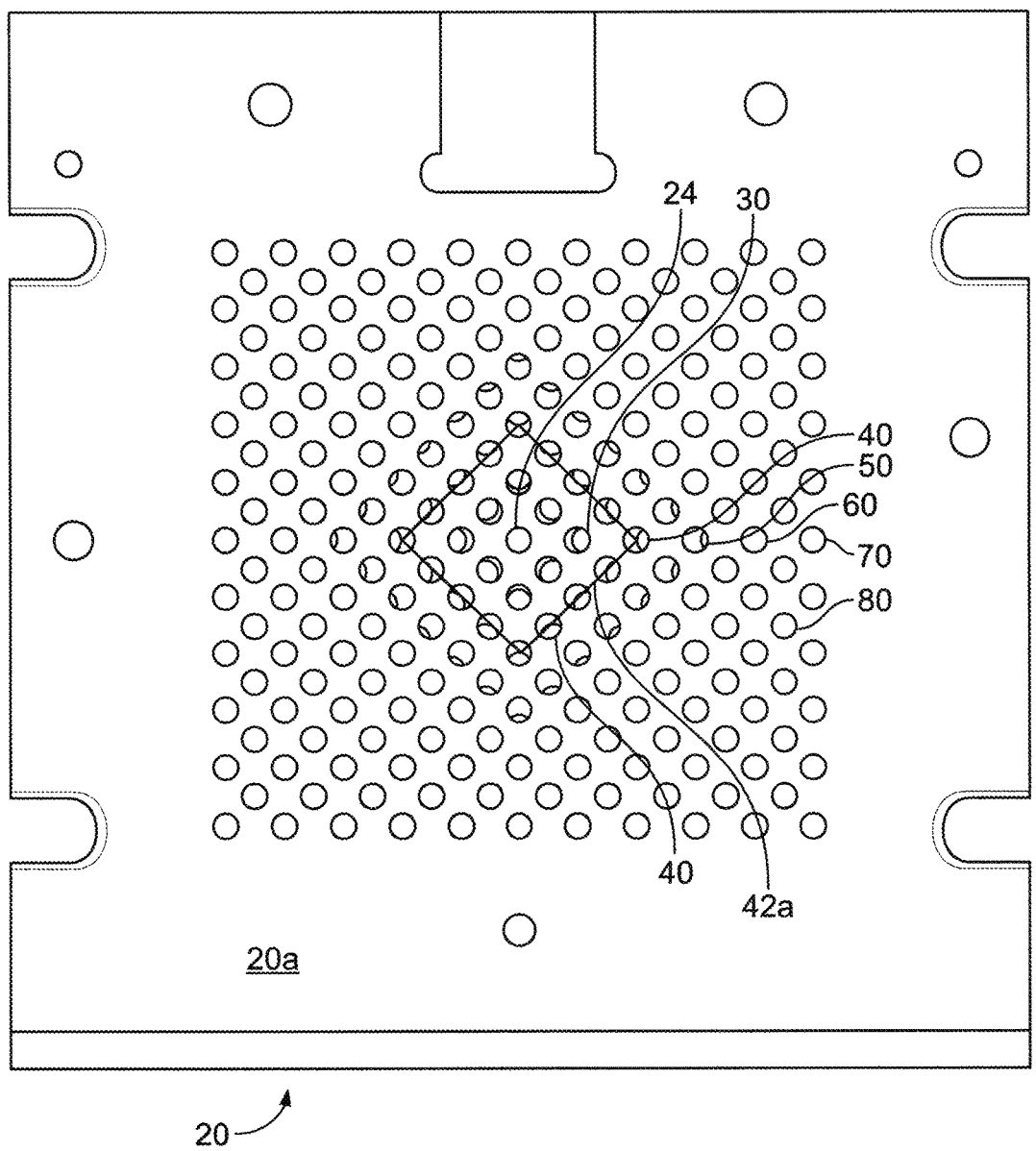
FIG. 9A is a plan view of the fill plate from a fill face side of the fill plate and showing a set of passageways with a second imaginary square on the fill face side.
Figure 9B:
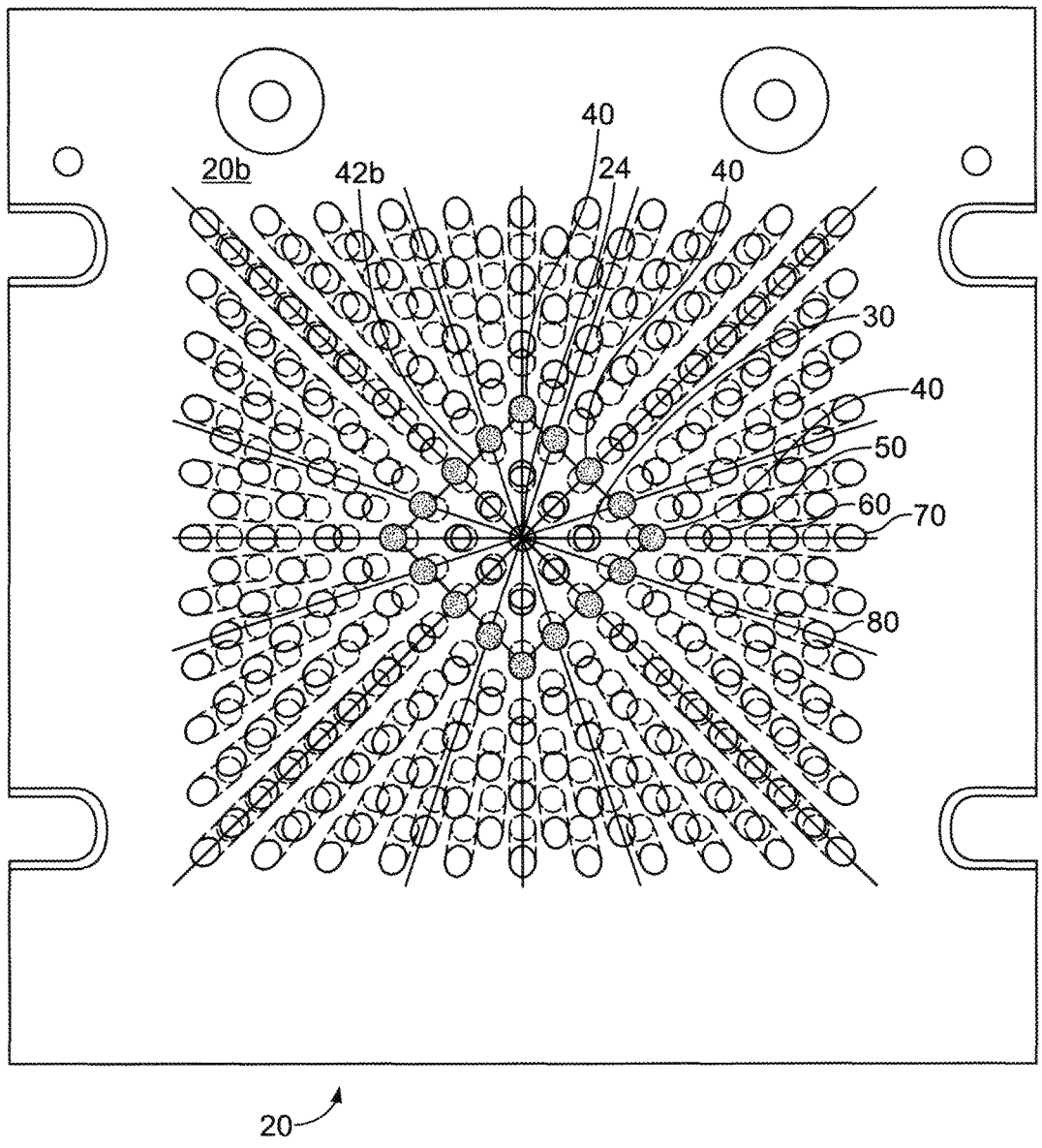
FIG. 9B is a plan view of the fill plate from the discharge face side of the fill plate and showing the set of passageways of FIG. 9A with a second imaginary square on the discharge face side, the inlets of the passageways through the fill plate begin shown in phantom line.
Figure 10A:
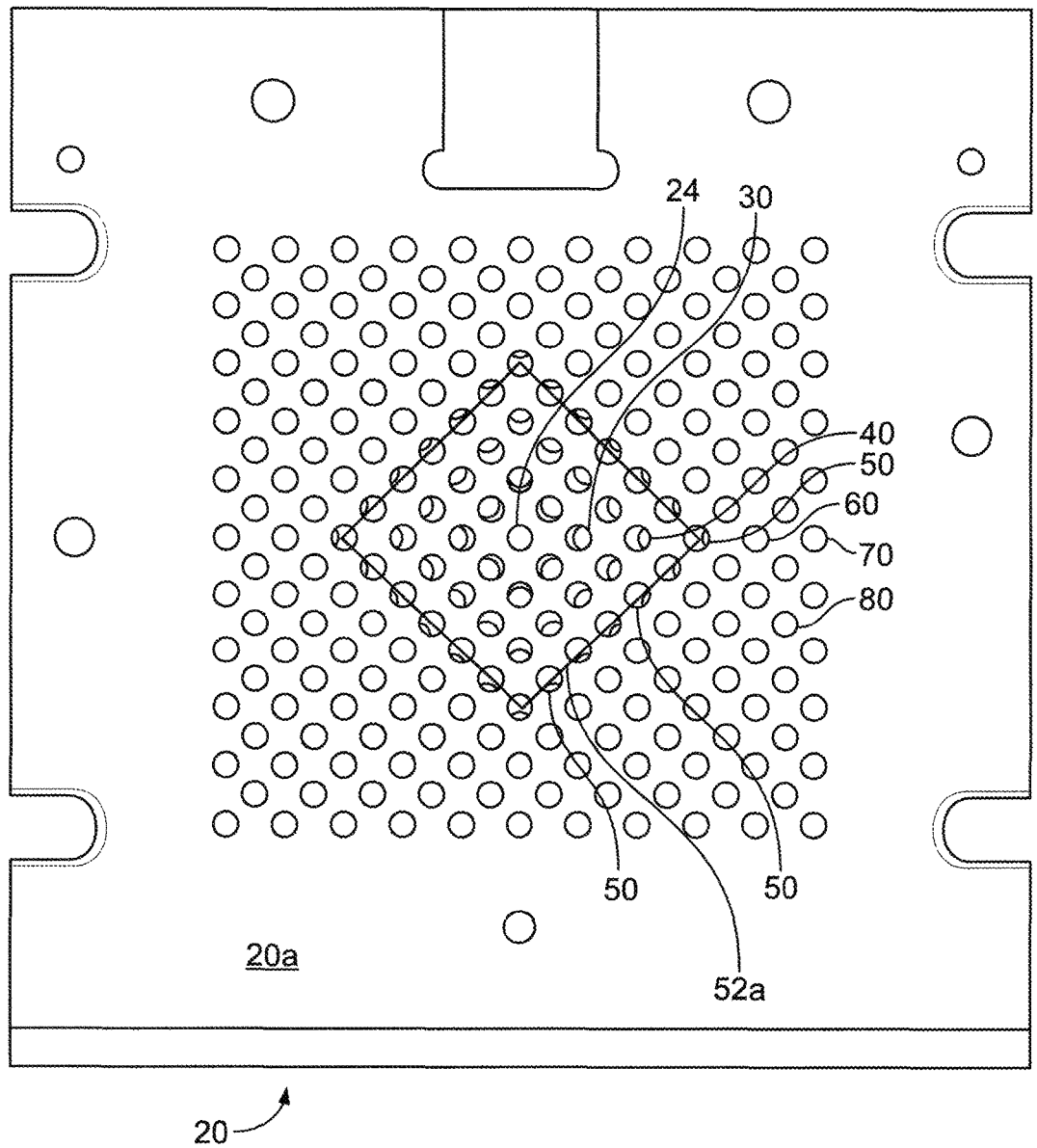
FIG. 10A is a plan view of the fill plate from a fill face side of the fill plate and showing a set of passageways with a third imaginary square on the fill face side.
Figure 10B:
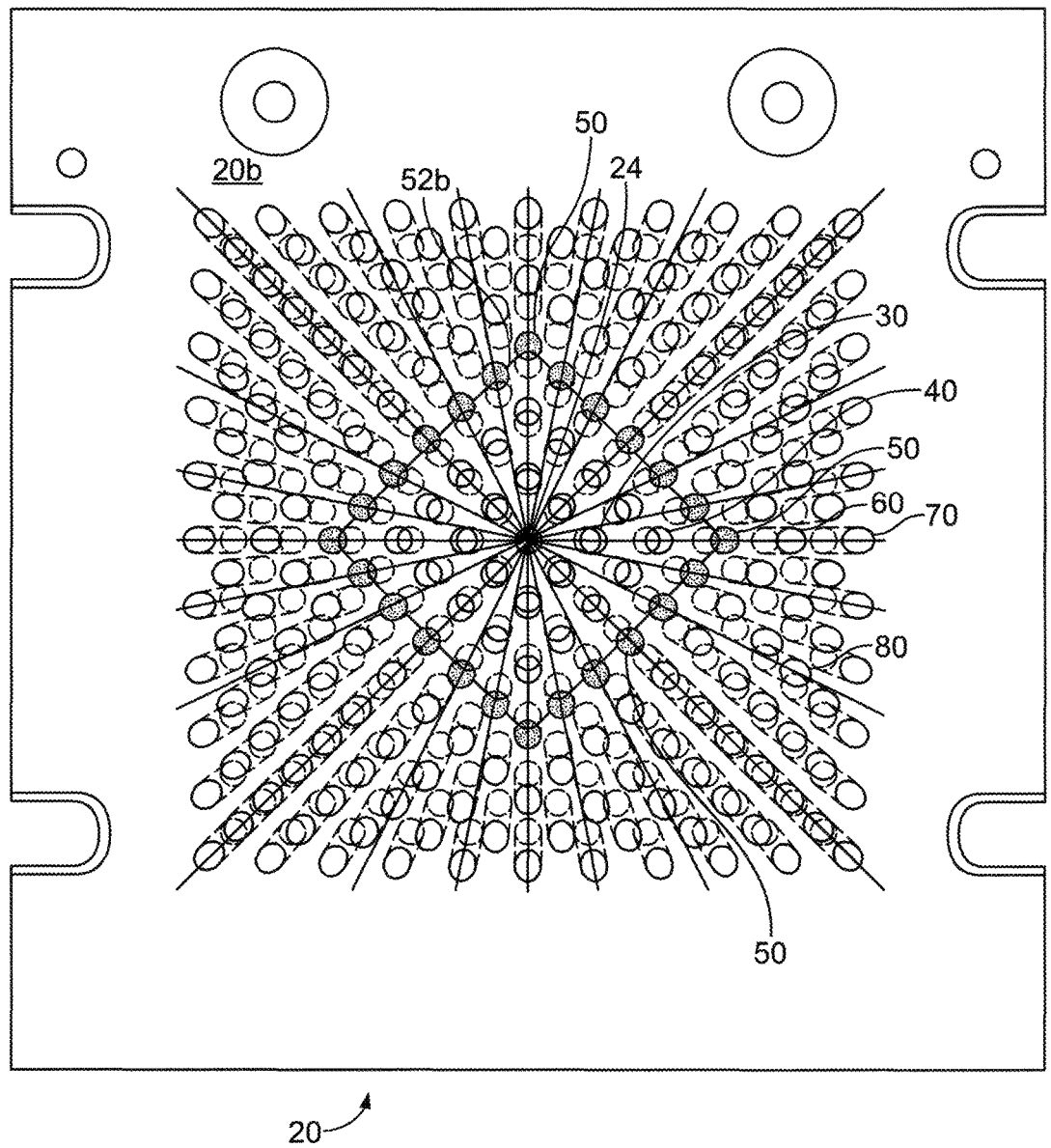
FIG. 10B is a plan view of the fill plate from the discharge face side of the fill plate and showing the set of passageways of FIG. 10A with a third imaginary square on the discharge face side, the inlets of the passageways through the fill plate begin shown in phantom line.
Figure 11A:
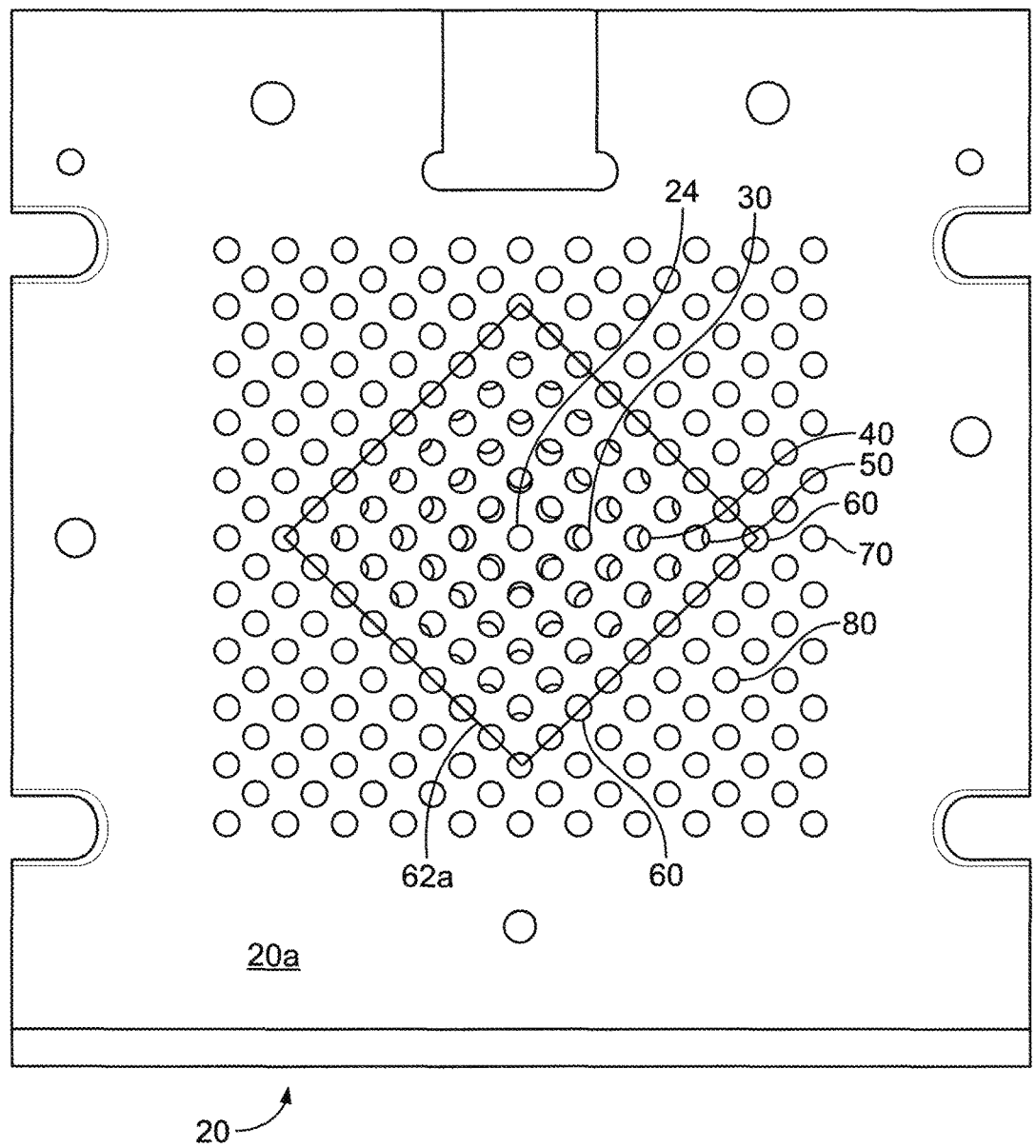
FIG. 11A is a plan view of the fill plate from a fill face side of the fill plate and showing a set of passageways with a fourth imaginary square on the fill face side.
Figure 11B:
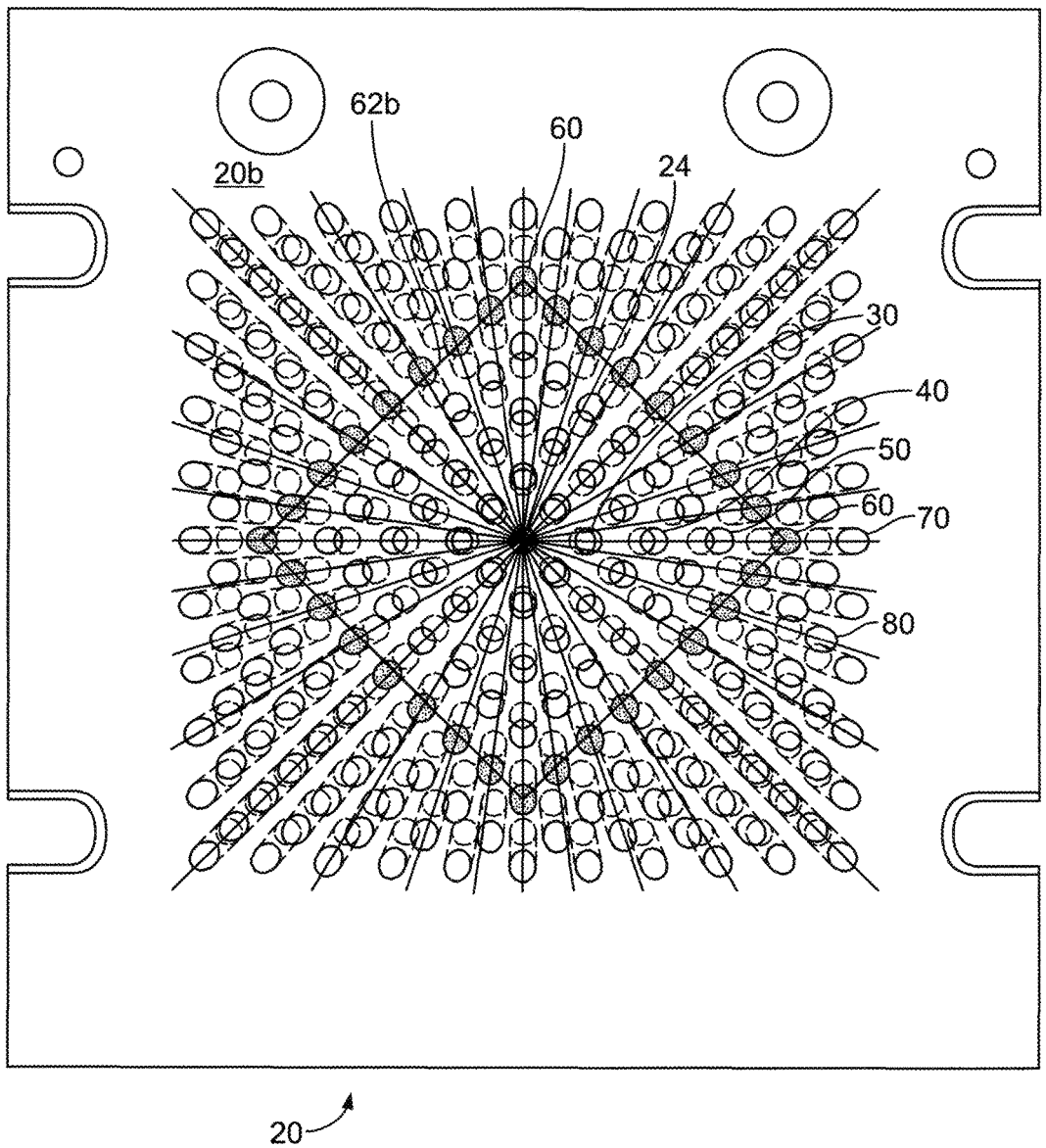
FIG. 11B is a plan view of the fill plate from the discharge face side of the fill plate and showing the set of passageways of FIG. 11A with a fourth imaginary square on the discharge face side, the inlets of the passageways through the fill plate begin shown in phantom line.

As shown in FIGS. 1 and 2, the breather plate 160 and the mold cover 162 are disposed immediately above the mold plate 158, closing off the top of each mold cavity 158c. Breather plates and mold covers are known in the art.

A housing 166 is positioned above the mold cover 162. The housing 166 encloses the operating mechanism (not shown) for the knock-out cups 164.

In the operation of the food patty molding machine 120, a supply of ground meat or other moldable food product is put into hopper 132, and is advanced toward the hopper outlet 134 by the conveyor belt 136. The feed screws 138 are actuated to feed the food product into the appropriate pump chamber 144, through the outlet slot 150 of the pump chamber 144, through the appropriate intake slot 152 of the manifold 146, through the outlet slot 154 of the manifold 146 and into and through the fill passageway 148. In FIGS. 1 and 2, the food pump system 128 is illustrated with the mold plate 158 in its fill position and with the food pump 142 ready to pump the moldable food product through the manifold 146. The second food pump of the food patty molding machine 120, at this time, may be receiving a supply of the food product for a subsequent pumping operation. The food pump 142 will begin its pumping stroke, and will compress the food product in the pump chamber 144, forcing it under pressure into the manifold 146.

Under pressure, the food product then flows into and through the passageways 157 of the stripper plate 156 which is in its fill position. The food product then flows into and through the passageways 24, 30, 40, 50, 60, 70, 80 of the fill plate 20. Thereafter, the food product flows into the mold cavities 158c in the mold plate 158 to form the patties.

In each molding cycle, the mold plate 158 remains in a fill position for a limited dwell interval. As the mold cavities 158c move into the fill position, one of the two food pumps 142 of the food patty molding machine 120 pumps food product through manifold 146, the fill passageway 148, the stripper plate 156 and the fill plate 20, thereby filling the mold cavities 158c in the mold plate 158. The stripper plate 156 is actuated to cut the fibers of the food product into predetermined lengths. To assure complete filling of the mold cavities 158c, the food pump 142 must apply a substantial pressure to the food product. Following the fill dwell interval, the mold plate 158 is moved outwardly, to the right from its fill position, as shown in FIGS. 1 and 2, until it reaches a discharge position with its mold cavities 158c aligned with the knockout cups 164. A second dwell interval occurs at the discharge position of the mold plate 158, during which the knockout cups 164 move downwardly through the mold cavities 158c, discharging the molded food patties onto the takeoff conveyor. Following discharge of the molded food patties, the mold plate 158 is moved back toward its fill position so that mold cavities 158c can again be filled with food product. In this manner, the food patties are molded at a rapid pace by the food patty molding machine 120.

Movement of the stripper plate 156 severs any long food fibers hung up on the stripper plate 156 and positions the fibers in alignment with the passageways 24, 30, 40, 50, 60, 70, 80. When movement of the food product commences in the fill dwell interval of the next mold plate cycle, the re-positioned fibers pass through the passageways 157 in the stripper plate 156 and the passageways 24, 30, 40, 50, 60, 70, 80 in the fill plate 20 and into the mold cavities 158c of the mold plate 158. During this fill dwell, additional fibers may accumulate on the edges of the passageways 157 in the stripper plate 156. Those fibers are re-positioned, and severed if long enough, when the stripper plate 156 slides back to its discharge location and then to its original fill position later in the next mold plate cycle. Thus, when the return movement of stripper plate 156 is completed, the fibers are again aligned with the passageways 157, 24, 30, 40, 50, 60, 70, 80 and will be impelled into the mold cavities 158c in the next fill dwell interval.

Ultimately, when the pump chamber 144 is nearly empty, the manifold 146 is rotated to connect its second intake slot (not shown) to the outlet of the second food pump (not shown) and to shut off its intake slot 152 from the first pump chamber 144. Thereafter, the second food pump is maintained in operation until the food supply is exhausted. During operation of the second food pump, the first food pump 142 is retracted to allow for refilling of the pump chamber 144 with food product. Subsequently, when the second food pump requires refilling, a corresponding changeover back to the first food pump 142 occurs. In this manner, overlapping alternating operation of the two food pumps continues as long as food patty molding machine 120 is in operation. Each time a food pump changeover occurs, it is preceded by a rotation of the manifold 146 to bring the new food pump into operation before the refill cycle for the food pump that has been in use is initiated.

The overall construction illustrated in the drawings has been found to be highly advantageous in the formation of hamburger patties and other molded food patties in several respects. With this multiple-passageway fill plate 20 arrangement, food product leaving the outlets 24b, 30b, 40b, 50b, 60b, 70b, 80b of passageways 24, 30, 40, 50, 60, 70, 80 of the fill plate 20 expands within the mold cavity 158c of the mold plate 358 adjacent to the outlets 24b, 30b, 40b, 50b, 60b, 70b, 80b, filling the mold cavity 158c completely. Since the passageways 24, 30, 40, 50, 60, 70, 80 through the fill plate 20 do not all extend in the same direction, a more random fiber pattern is produced in the mold cavities 158c. The food product flows only a short distance into the mold cavity 158c and expands from a series of locations immediately adjacent the outlets 24b, 30b, 40b, 50b, 60b, 70b, 80b of passageways 24, 30, 40, 50, 60, 70, 80 of the fill plate 20 instead of from one location. The result is an improvement in the texture of the molded food patties; the texture is more like that of a hand-molded food patty. Furthermore, the food patties tend to shrink less and hold their shape more consistently when cooked.

Because each passageway 24, 30, 40, 50, 60, 70, 80 of the fill plate 20 has an inlet 24a, 30a, 40a, 50a, 60a, 70a, 80a which is circular, the inlets 24a, 30a, 40a, 50a, 60a, 70a, 80a of the passageways 24, 30, 40, 50, 60, 70, 80 of the fill plate 20 precisely register with the discharge outlets 157b of the stripper plate 156. A seal-off can be achieved between the fill plate 20 and the stripper plate 156. At the same time, because the outlet sections 36, 46, 56, 66, 76 of the fill plate 20 are inclined, the advantages attributed to inclined passageways regarding patty structure can be achieved.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A fill plate for a food patty molding machine comprising:

a plate having a planar fill face and a planar discharge face, which are bounded by an edge to form a surface area; and a plurality of spaced apart passageways extending through the plate from the fill face to the discharge face, the plurality of spaced apart passageways forming rows and columns, the plurality of spaced apart passageways defining a first set of passageways and a second set of passageways, each passageway in the first set having a first inlet section and a first outlet section, the first inlet section extending from the fill face to the first outlet section in each passageway in the first set, the first outlet section extending from the first inlet section to the discharge face in each passageway in the first set, and the first outlet section is angled relative to the respective first inlet section at a first angle in each passageway in the first set, the first angle being greater than zero degrees, each passageway in the second set having a second inlet section and a second outlet section, the second inlet section extending from the fill face to the second outlet section in each passageway in the second set, the second outlet section extending from the second inlet section to the discharge face in each passageway in the second set, and the second outlet section is angled relative to the respective second inlet section at a second angle in each passageway in the second set, the second angle being greater than zero degrees, wherein the first and second angles are different.

2. The fill plate of claim 1, wherein the first angle is less than the second angle.

3. The fill plate of claim 1, further comprising a center passageway provided in a center of the fill plate, the center passageway extending through the plate from the fill face to the discharge face, the center passageway being cylindrical.

4. The fill plate of claim 3, wherein the first set of passageways is spaced outwardly from the center passageway, and the second set of passageways is spaced outwardly from the first set of passageways.

5. The fill plate of claim 4, wherein the first angle is less than the second angle.

6. The fill plate of claim 1, wherein the second set of passageways is spaced outwardly from the first set of passageways.

7. The fill plate of claim 6, wherein the first angle is less than the second angle.

8. The fill plate of claim 6, wherein the first inlet sections form a first imaginary square on the fill face and the first outlet sections form a first imaginary square on the discharge face, wherein the first imaginary square on the discharge face is larger than the first imaginary square on the fill face.

9. The fill plate of claim 8, wherein the second inlet sections form a second imaginary square on the fill face and the second outlet sections form a second imaginary square on the discharge face, wherein the second imaginary square on the discharge face is larger than the second imaginary square on the fill face.

10. The fill plate of claim 1, further comprising:

a third set of passageways, a fourth set of passageways and a fifth set of passageways, each passageway in the third set having a third inlet section and a third outlet section, the third inlet section extending from the fill face to the third outlet section in each passageway in the third set, the third outlet section extending from the third inlet section to the discharge face in each passageway in the third set, and the third outlet section is angled relative to the respective third inlet section at a third angle in each passageway in the third set, each passageway in the fourth set having a fourth inlet section and a fourth outlet section, the fourth inlet section extending from the fill face to the fourth outlet section in each passageway in the fourth set, the fourth outlet section extending from the fourth inlet section to the discharge face in each passageway in the fourth set, and the fourth outlet section is angled relative to the respective fourth inlet section at a fourth angle in each passageway in the fourth set, each passageway in the fifth set having a fifth inlet section and a fifth outlet section, the fifth inlet section extending from the fill face to the fifth outlet section in each passageway in the fifth set, the fifth outlet section extending from the fifth inlet section to the discharge face in each passageway in the fifth set, and the fifth outlet section is angled relative to the respective fifth inlet section at a fifth angle in each passageway in the fifth set, wherein the first, second, third fourth and fifth angles are different.

11. The fill plate of claim 10, wherein the first angle is less than the second angle, the second angle is less than the third angle, the third angle is less than the fourth angle, and the fourth angle is less than the fifth angle.

12. The fill plate of claim 10, wherein the second set of passageways is spaced outwardly from the first set of passageways, the third set of passageways is spaced outwardly from the second set of passageways, the fourth set of passageways is spaced outwardly from the third set of passageways, and the fifth set of passageways is spaced outwardly from the fourth set of passageways.

13. The fill plate of claim 10, wherein the first angle is 7 degrees, the second angle is 14 degrees, the third angle is 21 degrees, the fourth angle is 28 degrees, and the fifth angle is 35 degrees.

14. The fill plate of claim 1, wherein the first angle is 7 degrees, the second angle is 14 degrees and the third angle is 21 degrees.

15. The fill plate of claim 1, wherein each outlet section angles outwardly from a center of the plate and upwardly moving in a direction from the fill face to the discharge face.

16. A fill plate for a food patty molding machine comprising:

a plate having a planar fill face and a planar discharge face, which are bounded by an edge to form a surface area; and a plurality of spaced apart passageways extending through the plate from the fill face to the discharge face, the plurality of spaced apart passageways forming rows and columns, the plurality of spaced apart passageways defining a first set of passageways, a second set of passageways and a third set of passageways, each passageway in the first set having a first inlet section and a first outlet section, the first inlet section extending from the fill face to the first outlet section in each passageway in the first set, the first outlet section extending from the first inlet section to the discharge face in each passageway in the first set, and the first outlet section is angled relative to the respective first inlet section at a first angle in each passageway in the first set, the first angle being greater than zero degrees, each passageway in the second set having a second inlet section and a second outlet section, the second inlet section extending from the fill face to the second outlet section in each passageway in the second set, the second outlet section extending from the second inlet section to the discharge face in each passageway in the second set, and the second outlet section is angled relative to the respective second inlet section at a second angle in each passageway in the second set, the second angle being greater than zero degrees, each passageway in the third set having a third inlet section and a third outlet section, the third inlet section extending from the fill face to the third outlet section in each passageway in the third set, the third outlet section extending from the third inlet section to the discharge face in each passageway in the third set, and the third outlet section is angled relative to the respective third inlet section at a third angle in each passageway in the third set, wherein the first, second and third angles are different.

17. The fill plate of claim 16, wherein the first angle is less than the second angle and the second angle is less than the third angle.

18. The fill plate of claim 16, further comprising a center passageway provided in a center of the fill plate, the center passageway extending through the plate from the fill face to the discharge face, the center passageway being cylindrical.

19. The fill plate of claim 18, wherein the first set of passageways is spaced outwardly from the center passageway, the second set of passageways is spaced outwardly from the first set of passageways, and the third set of passageways is spaced outwardly from the second set of passageways.

20. A fill plate for a food patty molding machine comprising:

a plate having a planar fill face and a planar discharge face, which are bounded by an edge to form a surface area;

a center passageway provided in a center of the fill plate, the center passageway extending through the plate from the fill face to the discharge face, the center passageway being cylindrical; and a plurality of passageways forming a set, each passageway in the set having a first inlet section and a first outlet section, the first inlet section extending from the fill face to the first outlet section in each passageway in the set, the first outlet section extending from the first inlet section to the discharge face in each passageway in the set, and the first outlet section is angled relative to the respective first inlet section at a first angle in each passageway in the set, the set of passageways being spaced outwardly from the center passageway.

\* \* \* \* \*